(12) United States Patent
Buzanowski

(10) Patent No.: US 7,967,885 B2
(45) Date of Patent: Jun. 28, 2011

(54) LIQUID/GAS SEPARATOR

(75) Inventor: Mark A. Buzanowski, Carrollton, TX (US)

(73) Assignee: Peerless Mfg. Co., Dallas, TX (US)

( * ) Notice: Subject to any disclaimer, the term of this patent is extended or adjusted under 35 U.S.C. 154(b) by 163 days.

(21) Appl. No.: 12/320,928

(22) Filed: Feb. 9, 2009

(65) Prior Publication Data

US 2010/0199619 A1  Aug. 12, 2010

(51) Int. Cl.
*B01D 45/00* (2006.01)

(52) U.S. Cl. .......................................... 55/440; 55/443

(58) Field of Classification Search .................. 55/440, 55/443
See application file for complete search history.

(56) References Cited

U.S. PATENT DOCUMENTS 4,802,901 A * 2/1989 Wurz et al. ..................... 55/440

\* cited by examiner

*Primary Examiner* — Robert A Hopkins
(74) *Attorney, Agent, or Firm* — Andrews Kurth LLP

(57) ABSTRACT

An impact moisture separator for removing entrained liquids from a gas stream includes a plurality of outer vanes, each of the outer vanes oriented in a first direction; and a plurality of inner vanes, each of the inner vanes oriented in a second direction tilted away from the first direction by a specified angle.

18 Claims, 5 Drawing Sheets

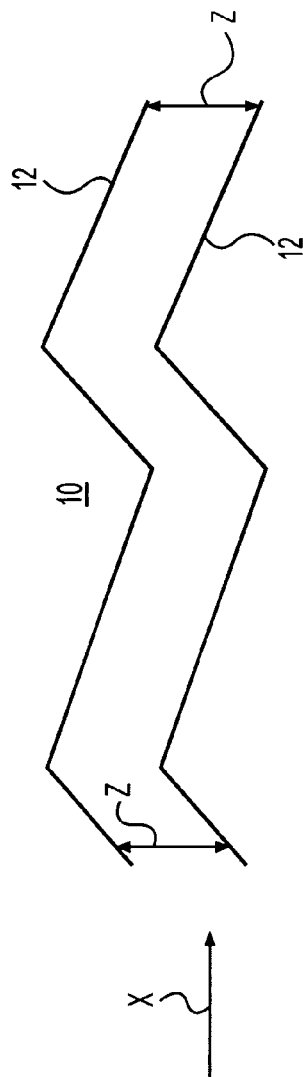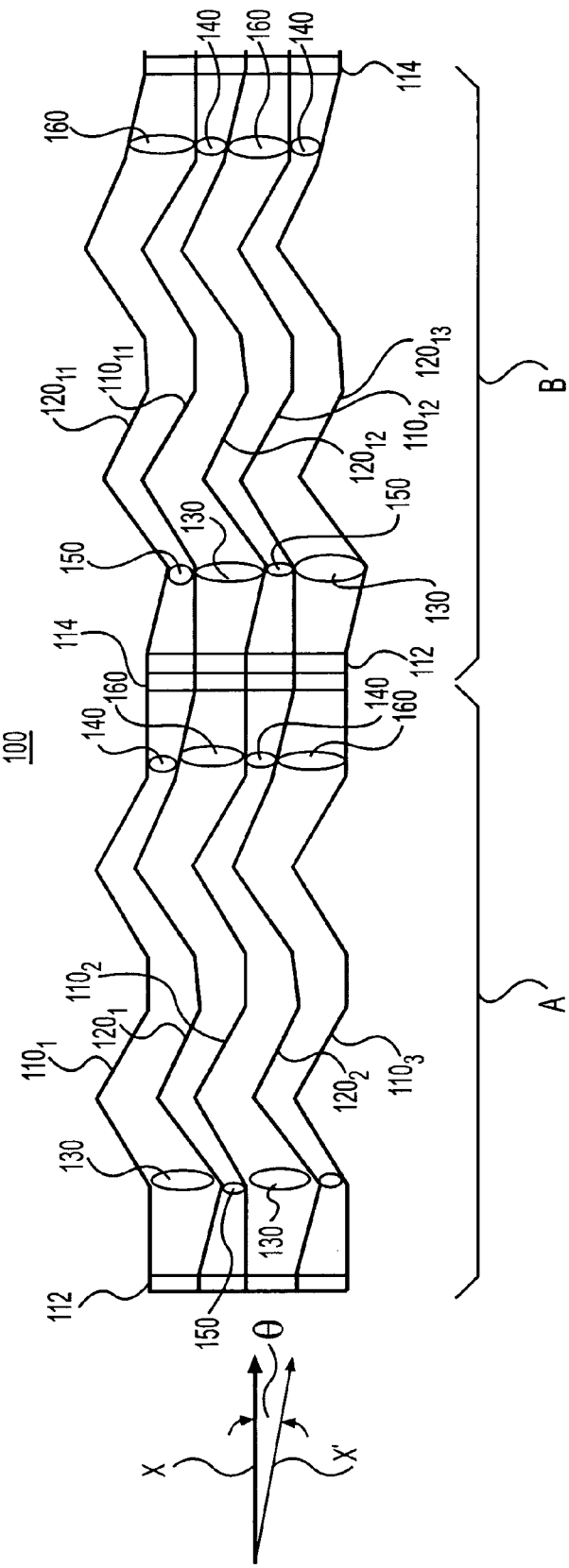

LIQUID/GAS SEPARATOR

TECHNICAL FIELD

The technical field is impact separators used for liquid-gas phase separation.

BACKGROUND

In many industrial processes, liquid and gas mixtures have to be phase separated in order to remove liquid droplets from gas streams to satisfy environmental standards (e.g., radioactive water from steam at nuclear power plants) or to purify gas streams, increase liquid recovery, and to protect rotating equipment located downstream (e.g., oil processing facilities, engine air intakes, gas processing plants). A complete phase separation will eventually occur without employing any mechanical devices given long contact times; however to accelerate this process several separation techniques have been proposed. These techniques operate based on one or more physical forces accelerating fluid separation, such as inertial, gravitational, diffussional, centrifugal and electrostatic. Mechanical equipment operating on these principles include impingement separators (baffle, wire mesh, vanes), as described in U.S. Pat. Nos. 3,938,972, 3,965,005, and 4,668,256, cyclones, as described, for example, in U.S. Pat. No. 3,979,392, knock-out pots, and filters, as described in U.S. Pat. Nos. 4,938,869 6,017,377, and 7,309,367, and wet precipitators, as described in U.S. Pat. No. 5,843,210.

The above separation techniques are selected based on the liquid collection efficiency requirement, gas flow rate and liquid loading, solid deposition tolerance, pressure drop, and capital cost. There is a need to develop liquid/gas separators that will achieve high level of liquid removal efficiency and throughput and at the same time minimize the amount of energy that is required to treat the gas (pressure drop) and minimize capital cost.

One of the most widely used gas/liquid separators are impingement separators. The basic elements of impingement separators are strategically located devices (targets) on which liquid droplets collide. The simplest impingement separators consist of a baffle or disk inserted against the vessel inlet. These separators provide low droplet removal efficiency but can remove bulk of the liquid entering the vessel. To improve efficiency and recovery of smaller droplets more sophisticated impingement separators have been developed. One type of these devices is vane-type separator that consists of parallel plates (see, e.g., U.S. Pat. Nos. 3,813,855, 4,581,051 and 4,557,740) that are straight or bent creating flow channels. Typically, the channels are of uniform cross section across their entire length (see, e.g., U.S. Pat. No. 5,972,062). In these devices, liquid droplets present in the gas stream impinge on the plates due to inertia of the droplets and collect on the vane surfaces in the form of a film of liquid. This liquid film (recovered liquid) drains down the vane into the collection devices without re-entrainment. The channels also can be arranged radially using serpentine vanes (see, e.g., U.S. Pat. No. 5,112,375).

Different arrangements of vanes are described in the open literature (see, e.g., Perry's Chemical Engineers' Handbook, Sixth Edition, McGraw-Hill, 1984, p. 18-74). In some applications vanes consist of flat plates bent at predetermined angle assembled parallel typically in a zig-zag fashion (see, e.g., U.S. Pat. Nos. 5,464,459 and 4,601,731). To increase liquid removal efficiency, vanes can be equipped with strategically located pockets that extend into the gas stream. Several patents disclose single and double vane pockets (see e.g., U.S. Pat. Nos. 6,852,146, 5,268,001 and 5,104,431). In both cases, pockets increase vane efficiency (liquid removal efficiency) either by increasing turbulence (single pockets) or improving gas dynamics (double pockets). The vanes can be arranged in a multi-pass arrangement (see, e.g., U.S. Pat. No. 6,083,302).

Regardless of the vane arrangement, a breakthrough point exists where liquid droplets will leave the separator if fluid velocity exceeds its critical value (typically empirically determined maximum allowed velocity) defined as fluid flow (standard cubic feet per minute, SCFM) divided by vane cross-sectional area (square feet). Such determined fluid velocity can be employed to determine fluid dynamic pressure ($\rho V^2$) that includes effects of fluid density. For a given fluid flow, in order to maintain fluid velocities or dynamic pressure values below critical values, the cross-sectional area of the vane is increased until velocity falls below its critical value. Unfortunately, such an increase of vane dimensions results not only in additional capital cost required to fabricate larger vanes, but also corresponding increase of the vane containing vessel dimensions that additionally greatly increases capital costs. Of course, a vane that would be capable of increasing allowable velocity without performance deterioration or the vane that would increase liquid removal efficiency without increasing vane dimensions would be beneficial considering technical and economical factors.

SUMMARY

What is disclosed is an impact moisture separator for removing entrained liquids from a gas stream comprising a plurality of outer vanes, each of the outer vanes oriented in a first direction; and a plurality of inner vanes, each of the inner vanes oriented in a second direction tilted away from the first direction by a specified angle, wherein each inner vane is disposed between two outer vanes.

Also disclosed is an impact separator for removing liquid entrained in a gas stream comprising a plurality of vanes disposed so as to form a plurality of acceleration and deceleration zones, whereby the gas stream decelerates to improve droplet removal efficiency and accelerates to provide sufficient centrifugal force to cause impingement of very small liquid droplets; and means for collecting liquid removed from the gas stream.

The impact moisture separator may be arranged with vanes assembled in series such that a deceleration zone is followed by an acceleration zone or another deceleration zone.

DESCRIPTION OF THE DRAWINGS

In the detailed description which follows, reference will be made to the following Figures in which like numerals refer to like items, and in which:

FIG. 1 illustrates a prior art impact vane separator;

FIG. 2A illustrates an embodiment of a portion of an improved impact vane separator in which the vane separation varies over the length of the vanes;

DETAILED DESCRIPTION

Figure 2B:
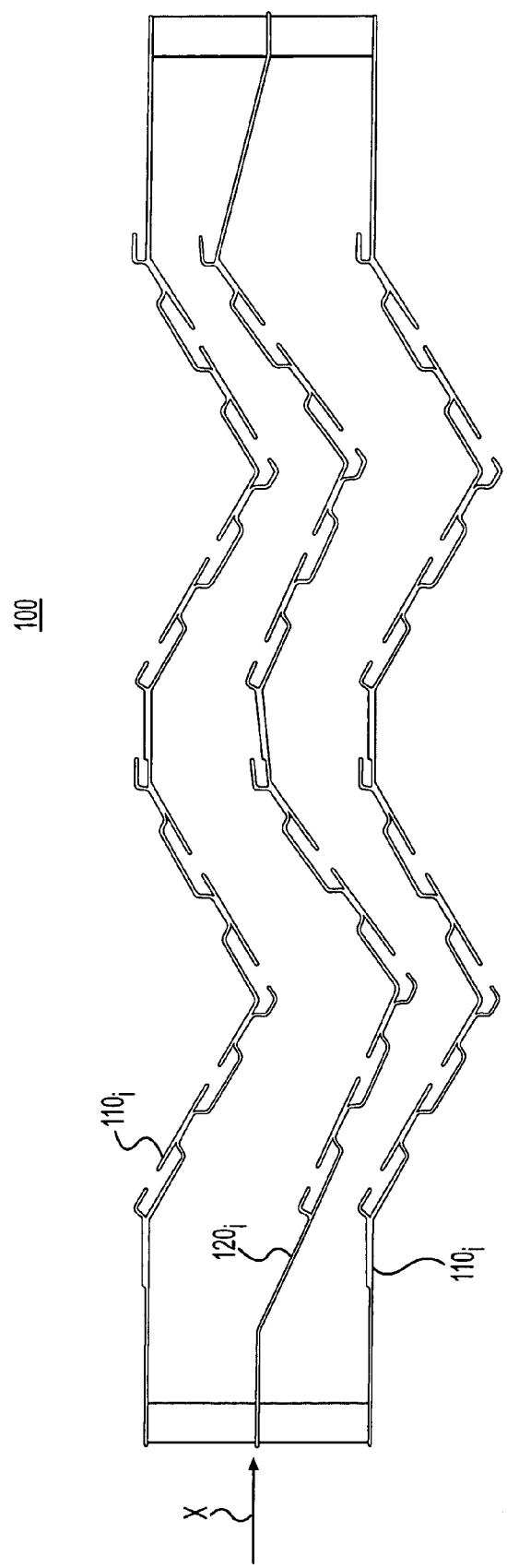
FIG. 2B illustrates additional details of vanes used with the impact vane separator of FIG. 2A.

The disclosed liquid-gas vane separator falls into the class of inertial impaction, or impingement, separators. Inertial impact separation occurs when a gas-liquid stream passes through a tortuous path around a vane. The gas follows the tortuous path while entrained liquid droplets and solids tend to go in straighter paths, impacting the vane surfaces. The impacting droplets coalesce on the vane surfaces and drain away from the gas stream.

One design objective of the vane separator is to maximize liquid droplet removal efficiency while preventing liquid re-entrainment. Re-entrainment occurs when liquid droplets accumulated on the vanes are carried off by the exiting gas. This occurs when the force exerted on the liquid droplets clinging to the vanes due to the velocity of the exiting gas, or annular velocity, exceeds the gravitational forces of the draining droplets. Thus, in designing a vane separator (and its corresponding coalescer), the following parameters may be taken into account: gas velocity through the coalescer stages, annular velocity of gas exiting the stages, solid and liquid aerosol concentration in the inlet gas, and drainability of the coalescer. Each of these factors, with the exception of the inlet aerosol concentration, can be controlled. At a constant gas flow rate, gas velocity can be controlled by either changing the profile or varying the spacing of the vanes.

FIG. 1 illustrates a typical prior art impact vane separator. Vane separator 10 includes multiple vanes 12 (only two of which are shown) oriented so that a gas stream X (indicated by the arrow) traverses the length of the vanes 12. The vanes 12 are bent so as to cause the gas stream to change direction rapidly. This rapid change in direction imparts a centrifugal forces on the gas stream, with the result that relatively heavy liquid droplets entrained in the gas stream impact the surface of the vanes 12, coalesce there into larger droplets, and then fall by gravitational force to the bottom of the separator 10, where the droplets are collected and removed. The vanes 12 are separated by a generally constant distance Z as shown.

In an improvement of the vane separator 10 of FIG. 1, disclosed herein is a vane separator having non-constant separation between individual vanes, thereby creating a number of fluid acceleration and deceleration zones to separate liquids from gaseous streams. In these zones, fluid velocity changes because the gas path defined as the cross-section of the spacing between the individual vanes is not constant. Consequently, at any depth x into the vane, the gas stream accelerates or decelerates changing centrifugal forces. In a zone where cross-section increases, the fluid velocity decreases and the fluid decelerates. In this zone the vane is capable of higher capacity than a conventional vane operating with constant velocity (parallel configuration of individual vanes as well as removing small droplets below 10 micron of diameter. The vane acceleration zone is capable of high efficiency (as compared to a conventional vane), capturing very small particles because of the higher centrifugal forces created in this zone. The acceleration zone also is very efficient when installed in series after a deceleration zone. This arrangement of a deceleration zone followed by an acceleration zone allows additional removal of liquid droplets that might pass through the deceleration zone.

As an alternative to improving liquid droplet removal efficiency by using he above described vane structure, it is possible to increase fluid velocity by reducing vane dimensions and still achieve the same droplet removal efficiency. As a result, by changing the arrangement of the individual vanes it is possible to reduce vane and vessel size and minimize capital cost. FIG. 2A shows an embodiment of such an improved vane separator.

In FIG. 2A, vane separator 100 includes multiple outer vanes $110_i$, and inner vanes $120_i$ (with only a limited number of vanes shown for simplicity). The outer vanes $110_i$ generally are oriented parallel to the gas stream indicated by the arrow; i.e., in the X-direction. Alternately, the vanes $110_i$ may be positioned at some predetermined angle relative to the general direction of the gas stream. The vanes $120_i$ are inclined by some small angle θ from the directional orientation of the vanes $110_i$ (i.e., in the direction indicated by arrow X'. As shown, each inner vane $120_i$ is disposed between two outer vanes $110_i$, so that, generally, the inner vanes $120_i$ and outer vanes $110_i$ alternate. As a result of this tilting, the separation between the vanes $110_i$ and $120_i$ is not constant; however, the separation between the vanes $100_1$ is constant. As can be seen, the inlet separation 130 between the outer vane $110_1$ and the inner vane $120_1$ is equal in spacing to the outlet separation 160 between the inner vane $120_{11}$ and the outer vane $110_{11}$. Likewise, the outlet separation 140 between the outer vane $110_{12}$ and the inner vane $120_{12}$ is equal in spacing to the inlet separation 150 between the inner vane $120_1$ and the outer vane $110_2$. Thus, the vane separator 100 comprises a plurality of fluid acceleration and fluid deceleration zones. More specifically, when the inlet spacing between vane $120_i$ and $110_i$ is smaller than the corresponding outlet spacing a deceleration zone is created. Correspondingly, when the inlet spacing is larger than the outlet spacing, an acceleration zone is created. In the deceleration zones, the fluid or gas-liquid mixture traversing the vane separator decelerates, and the liquid handling capacity of the vane separator 100 for removing liquid droplets entrained in the gas stream increases. By creating deceleration zones, the vane separator 100 is able to increase liquid handling capacity and more efficiently remove liquid droplets than would a typical vane separator that maintains essentially constant distance or spacing between vanes. When the gas-liquid mixture traversing the vane separator accelerates, the fluid stream experiences increased centrifugal forces, which improves removal efficiency for large and small droplets. Table 1, below, shows the improvement in liquid droplet removal efficiency for the improved vane separator as disclosed herein compared to the prior art vane separator (in Table 1, the "constant spacing" vane), and for an improved vane separator as disclosed herein. In the example shown, the improved vane separator uses vanes having a small tilt angle, less than 45 degrees, preferably less than about 5 degrees and more preferably about a 2-degree tilt (i.e., every other vane is inclined approximately 2 degrees from the nominal flow axis of the vane separator).

TABLE 1

COMPARISON OF DROPLET REMOVAL EFFICIENCY

| VANE | V (ft/s) | Percent improvement in droplet removal efficiency |
| --- | --- | --- |
| Constant Spacing | 84.9 | |
| Constant Spacing | 97.1 | |
| 2-Degree Tilt | 84.9 | 6.3 |
| 2-Degree Tilt | 97.1 | 24.5 |

The vanes $110_i$ and $120_i$ may include front pieces 112 and end pieces 114, which are oriented along the x-direction so that the gas stream entering the vanes and exiting the vanes and exiting the vanes flows generally in the direction of orientation of the vanes $110_i$ and $120_i$, and is equally divided.

As shown in FIG. 2A, the vane separator 100 may comprises back-to-back sets of the vanes $110_i/120_i$. That is, the fluid stream may traverse a first vane set A (vanes $110_i$ and $120_i$) and then traverse one or more additional vane sets B.

The vanes $110_i$ and $120_i$ may be formed from steel or aluminum. Aluminum vanes may be formed by extrusion. The vanes $110_i$ and $120_i$ also may be formed from a resin mixture and may be formed by pultrusion.

As shown in FIG. 2B, the vanes $110_i$ and $120_i$ may incorporate one or more pockets that limit liquid re-entrainment. The use of such pockets to prevent re-entrainment of liquid droplets is discussed in detail in U.S. Pat. No. 5,104,431, the disclosure of which is hereby incorporated by reference. Besides pockets formed on the surfaces of the vanes, other means for collecting or for enhancing the collection of liquid droplets, include surface treatments applied to the vanes $110_i$ and $120_i$ to increase wetability, and a sump positioned to receive gravity drainage from the vanes $110_i$ and $120_i$.

Figure 3:
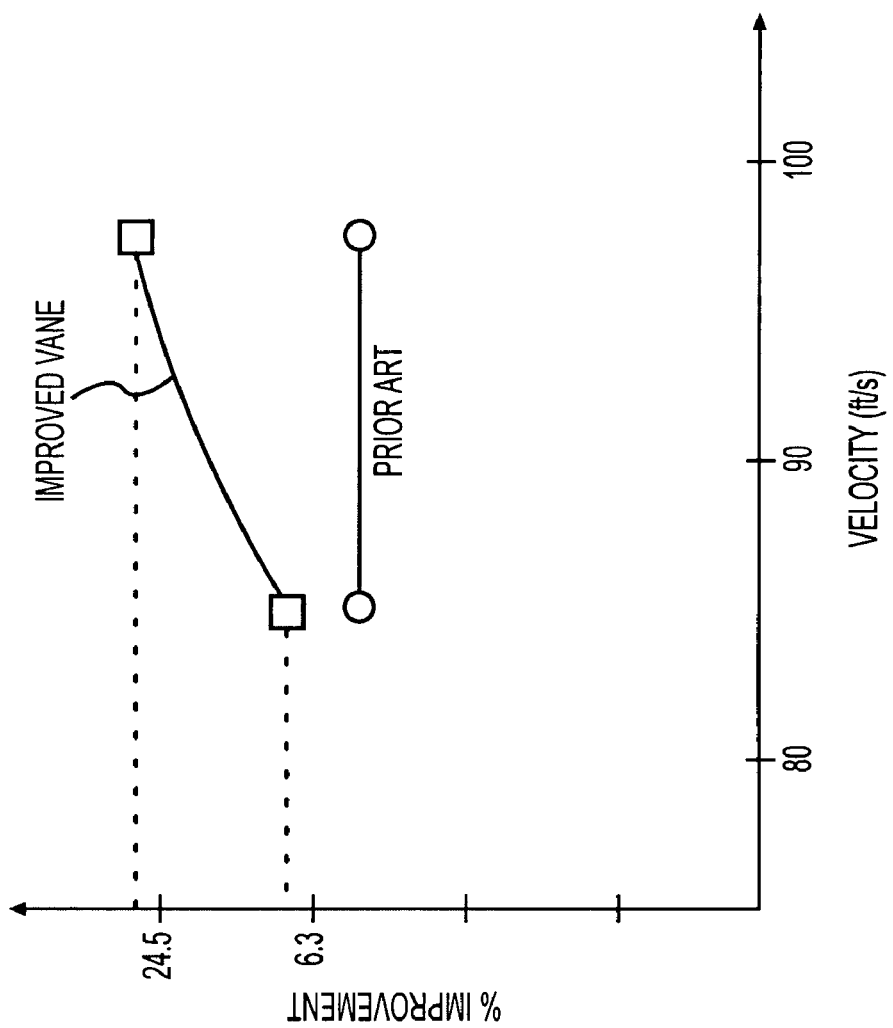
FIG. 3 illustrates droplet removal efficiency for 10 micron and smaller droplets.

FIG. 3 illustrates droplet removal efficiency for 10 micron and smaller droplets versus fluid velocity for both the vane separator 100 of FIG. 2A and the prior art, constant spacing, vane separator. FIG. 3B shows that the vane separator 100 achieves better droplet removal efficiency than does the prior art, constant spacing, vane separator.

Figure 4:
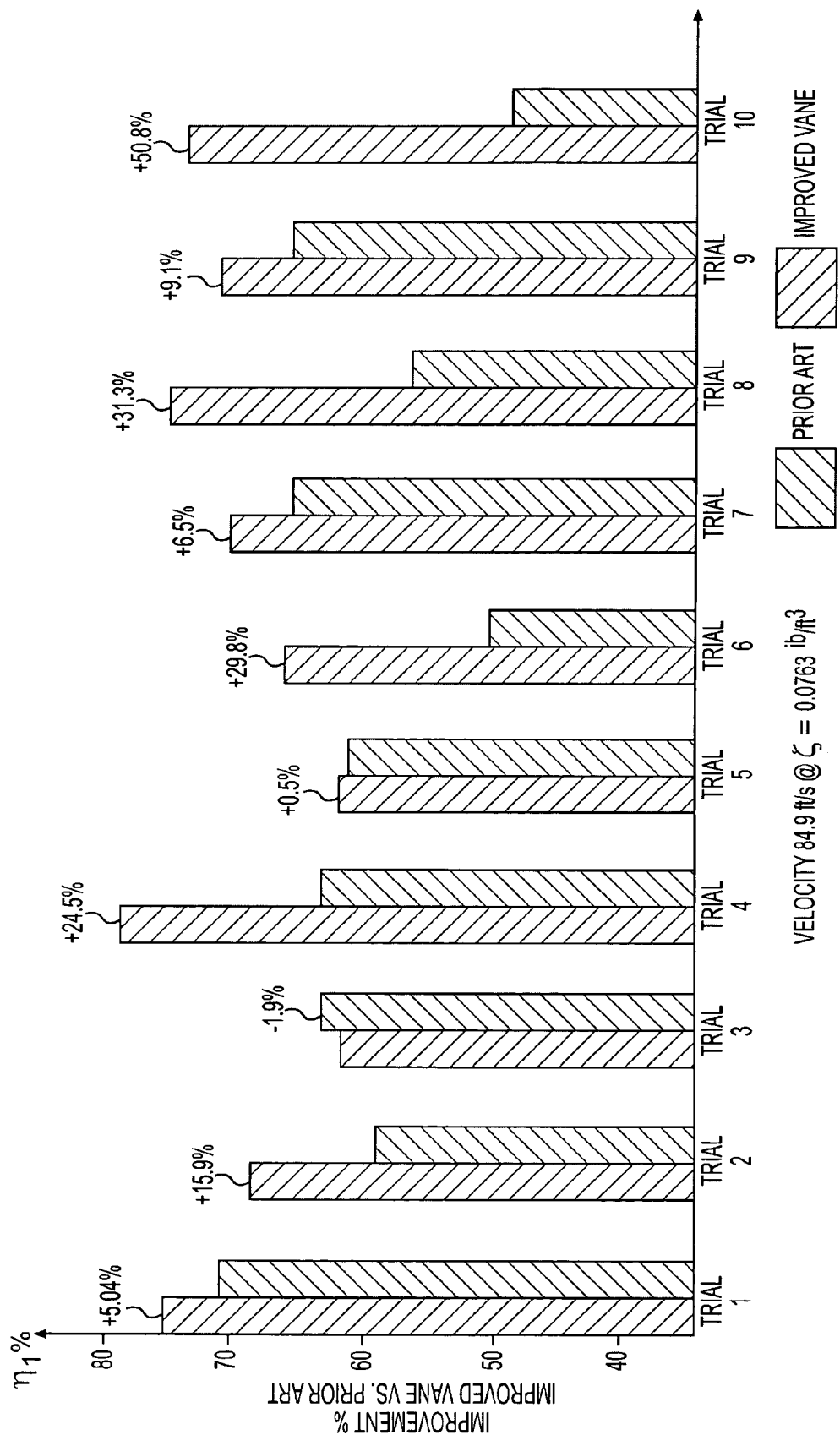
FIG. 4 illustrates trial results comparing droplet removal efficiency for the improved vane separator of FIG. 2A and the prior art vane separator.

FIG. 4 presents the results of ten trial runs to measure droplet removal efficiency for the vane separator 100 and for the prior art, constant spacing, vane separator. The test runs were executed with a fluid velocity of 84.9 ft/s and a density of 0.0763 lb/ft$^3$. As can be seen, in all but one trial run, the vane separator 100 achieved superior results compared to the prior art, constant spacing, vane separator.

Figure 5:
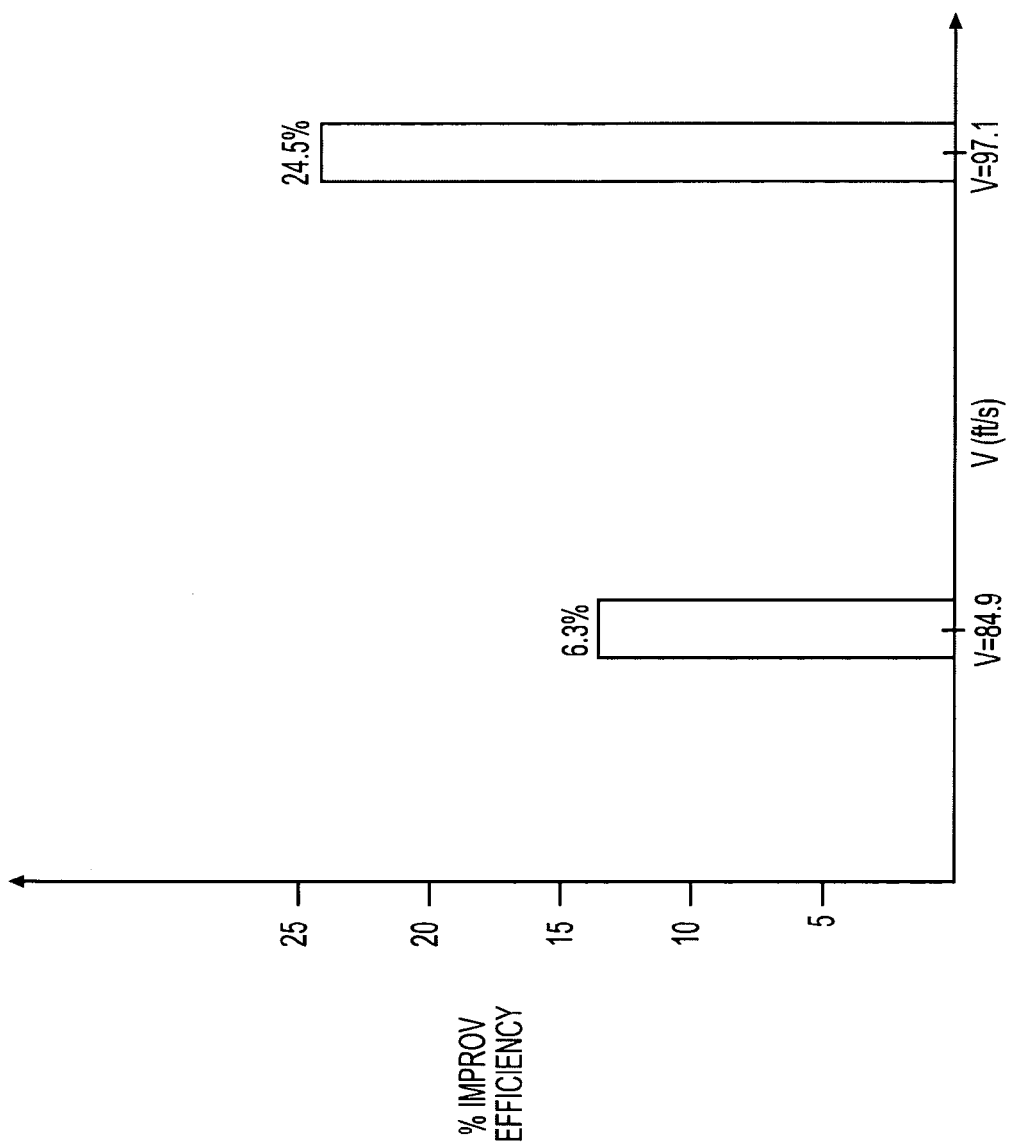
FIG. 5 illustrates the percentage improvement in droplet removal efficiency during operation of the vane separator of FIG. 2A.

FIG. 5 illustrates the improvement in droplet removal efficiency resulting from operation of the vane separator 100 of FIG. 2A relative to the droplet removal efficiency of the prior art, constant spacing vane separator. As can be seen, with a fluid velocity of 84.9 ft/s, the vane separator 100 achieves a 6.3 percent improvement in droplet removal efficiency. At a fluid velocity of 97.1 ft/s, the vane separator achieves a 24.5 percent improvement in droplet removal efficiency.

Because the vane separator 100 of FIG. 2A produces improved droplet removal performance for a given flow rate, one design option is to retain the same droplet removal efficiency as in current vane separators while taking advantage of the reduced volume and weight attendant with the improved design of the vane separator 100. That is, the vane separator 100 can achieve the same droplet removal efficiency in a smaller and lighter package than in current vane separators.

Although the variable spacing vane separator 100 has been described in connection with the preferred structure and modifications to that preferred structure, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

What is claimed is:

1. An impact moisture separator for removing entrained liquids from a gas stream, comprising:
   a plurality of outer vanes, each of the outer vanes oriented in a first direction, wherein the first direction defines an axis through which passes a front end and a rear end of a outer vanes, the outer vanes comprise a series of bends formed to cause a change in direction of the gas stream and the outer vanes, including the series of bends, are substantially parallel to each other;
   a plurality of inner vanes, each of the inner vanes oriented in a second direction tilted away from the first direction by a specified angle, wherein each inner vane is disposed between two outer vanes, the inner vanes comprise a series of bends formed to cause a change in direction of the gas stream and each inner vane is of varying distance from the two outer vanes throughout the length of the inner vane.

2. The impact moisture separator of claim 1, wherein each of the first and the inner vanes comprises front pieces and tail pieces oriented in a direction generally parallel to the gas stream.

3. The impact moisture separator of claim 1, wherein the first direction is generally parallel to the gas stream.

4. The impact moisture separator of claim 1, wherein a plurality of the inner vanes are disposed between two of the plurality of outer vanes, thereby defining a plurality of fluid deceleration zones.

5. The impact moisture separator of claim 1, wherein the specified angle is approximately two degrees.

6. The impact moisture separator of claim 1, wherein each of the outer and the inner vanes comprises one or more pockets disposed and configured to trap liquid droplets.

7. The impact moisture separator of claim 1, wherein the inner and outer vanes are disposed in sets, and wherein the vane separator comprises a plurality of vane sets.

8. The moisture impact separator of claim 1, wherein the plurality of outer vanes is oriented at a fixed direction and the plurality of inner vanes is tilted from the fixed direction by a small angle.

9. The moisture impact separator of claim 8, wherein the small angle is less than 25 degrees.

10. The moisture impact separator of claim 8, wherein the small angle is less than 5 degrees.

11. The moisture impact separator of claim 1, wherein the plurality of outer vanes and the plurality of inner vanes are disposed in vane sets in a series arrangement, wherein an acceleration zone in a first vane set is followed by a one of a deceleration zone and an acceleration zone in a second vane set and a deceleration zone in the first vane set is followed an acceleration zone in the second vane set.

12. An impact separator for removing liquid entrained in a gas stream, comprising:
    a plurality of vanes disposed so as to form a plurality of deceleration zones, whereby the gas stream decelerates to improve droplet removal efficiency wherein the plurality of vanes are disposed in vane sets in a series arrangement, wherein an acceleration zone in a first vane set is followed by a one of a deceleration zone and an acceleration zone in a second vane set and a deceleration zone in the first vane set is followed an acceleration zone in the second vane set; and
    means for collecting liquid removed from the gas stream.

13. The impact separator of claim 12, wherein a first set of vanes is oriented at a fixed direction and a second set of vanes is tilted from the fixed direction by a small angle.

14. The impact separator of claim 13, wherein every other vane of the plurality of vanes is tilted by the small angle.

15. The impact separator of claim 13, wherein the small angle is less than 25 degrees.

16. The moisture impact separator of claim 13, wherein the small angle is less than 5 degrees.

17. The impact separator of claim 12, wherein the vane separator comprises two or more sets of vanes.

18. The impact separator of claim 12, wherein treated gas leaving the first vane set is supplied to the second vane set.

\* \* \* \* \*